(12) United States Patent
Backström et al.

(10) Patent No.: US 9,658,078 B2
(45) Date of Patent: May 23, 2017

(54) SYSTEM AND METHOD FOR PROCESSING OF TACTICAL INFORMATION IN COMBAT VEHICLES

(71) Applicant: BAE Systems Hägglunds Aktiebolag, Örnsköldsvik (SE)

(72) Inventors: Ronny Backström, Umeå (SE); Mikael Segerman, Örnsköldsvik (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 0 days.

(21) Appl. No.: 14/897,489

(22) PCT Filed: Jun. 26, 2014

(86) PCT No.: PCT/SE2014/050793
§ 371 (c)(1),
(2) Date: Dec. 10, 2015

(87) PCT Pub. No.: WO2015/005849
PCT Pub. Date: Jan. 15, 2015

(65) Prior Publication Data
US 2016/0123757 A1    May 5, 2016

(30) Foreign Application Priority Data
Jul. 12, 2013    (SE) ..................... 1350869

(51) Int. Cl.
*G01C 21/36*    (2006.01)
*F41H 7/02*    (2006.01)
(Continued)

(52) U.S. Cl.
CPC ........... *G01C 21/3602* (2013.01); *F41H 7/02* (2013.01); *G01C 21/26* (2013.01); *G06F 3/14* (2013.01);
(Continued)

(58) Field of Classification Search
CPC .... G01C 21/3602; G01C 21/26; H04N 5/765; G06T 7/0038; G06T 11/60;
(Continued)

(56) References Cited

U.S. PATENT DOCUMENTS 5,781,437 A    7/1998    Wiemer et al.
8,576,286 B1 *  11/2013   Childs .................... G01C 21/00
                                                    348/113

(Continued)

FOREIGN PATENT DOCUMENTS

AU    3611797 A    3/1998
WO   93/00647 A2   1/1993

OTHER PUBLICATIONS

International Search Report received for PCT Application No. PCT/SE2014/050793, mailed on Aug. 21, 2014, 5 pages.

(Continued)

*Primary Examiner* — Rodney Butler
(74) *Attorney, Agent, or Firm* — Morrison & Foerster LLP

(57) ABSTRACT

The invention pertains to a system, a method, a computer program and a combat vehicle with an integrated system, for processing of tactical information. The system comprises at least one sensor for registration of at least one image sequence display at least a portion of the surroundings of the combat vehicle. The system further comprises a navigation module arranged to register a current position of the vehicle. The system further comprises a tactical data module for storage of tactical information and an information processing unit arranged to process said image sequence to superimpose the tactical information onto said image sequence.

26 Claims, 4 Drawing Sheets

(51) Int. Cl.
*G01C 21/26* (2006.01)
*G06T 7/00* (2006.01)
*G06T 11/60* (2006.01)
*H04N 5/76* (2006.01)
*H04N 5/765* (2006.01)
*G06T 7/38* (2017.01)
*G06F 3/14* (2006.01)

(52) U.S. Cl.
CPC ............... G06T 7/38 (2017.01); G06T 11/60 (2013.01); H04N 5/765 (2013.01); *G06T 2207/10016* (2013.01); *G06T 2207/30212* (2013.01); *G06T 2207/30252* (2013.01); *G09G 2340/12* (2013.01); *G09G 2380/10* (2013.01)

(58) Field of Classification Search
CPC . G06T 2207/10016; G06T 2207/30212; G06T 2207/30252; F41H 7/02
See application file for complete search history.

(56) References Cited

U.S. PATENT DOCUMENTS

| | | |
|---|---|---|
| 2003/0158635 A1 | 8/2003 | Pillar et al. |
| 2004/0030463 A1 | 2/2004 | Stockdale et al. |
| 2006/0164261 A1* | 7/2006 | Stiffler .................. G01C 23/00 340/945 |
| 2006/0229801 A1 | 10/2006 | Fink et al. |
| 2007/0164877 A1* | 7/2007 | Mumaw ................. G01C 23/00 340/973 |
| 2007/0247457 A1* | 10/2007 | Gustafsson ............... F41G 1/00 345/420 |
| 2008/0158256 A1 | 7/2008 | Russell et al. |
| 2008/0215192 A1* | 9/2008 | Hardman ................ G01C 23/00 701/3 |
| 2009/0052806 A1* | 2/2009 | Morbey ................. G09B 29/00 382/302 |
| 2010/0277588 A1* | 11/2010 | Ellsworth ........... G06F 17/3087 348/144 |
| 2010/0287500 A1* | 11/2010 | Whitlow ................ G02B 27/01 715/810 |
| 2011/0215985 A1* | 9/2011 | Kaplan .................. H01Q 21/08 343/879 |
| 2012/0097741 A1* | 4/2012 | Karcher .................... F41G 1/38 235/404 |

OTHER PUBLICATIONS

International Preliminary Report on Patentability received for PCT Patent Application No. PCT/SE2014/050793, mailed on Jan. 21, 2016, 6 pages.
Written Opinion received for PCT Patent Application No. PCT/SE2014/050793, mailed on Aug. 21, 2014, 4 pages.
Extended European Search Report (includes Supplementary European Search Report and European Search Opinion) received for European Patent Application No. 14822643.4, mailed on Jan. 17, 2017, 9 pages.

* cited by examiner

SYSTEM AND METHOD FOR PROCESSING OF TACTICAL INFORMATION IN COMBAT VEHICLES

CROSS REFERENCE TO RELATED APPLICATIONS

This application is a U.S. National Stage patent application of PCT/SE2014/050793, filed on Jun. 26, 2014, which claims priority to Swedish Patent Application No. 1350869-2, filed on Jul. 12, 2013, the entire contents of which are incorporated herein by reference.

FIELD OF THE INVENTION

The present invention pertain to a method and a system for processing of tactical information in a combat vehicle. In particular the invention pertain to a method and a system for processing of tactical information with the purpose of improving situational awareness of combat vehicles operators, such as drivers, gunners and vehicle commanders. The invention also pertain to a computer program for processing of tactical information.

BACKGROUND OF THE INVENTION

Historically, tactical information intended for operators of combat vehicles have been provided by means of paper maps (e.g. 2D maps) with plotted information displaying tactical information such as for example presumed positions of enemy/own troop, suitable advance routes, suitable firing positions etc.

Recently, tactical information intended for operators of combat vehicles have traditionally been provided via battle management systems in the form of digitized 2D maps with superimposed tactical information where this tactical information can be updated based on tactical information provided from a command center.

Modern combat vehicles are typically equipped with a set of sensors, such as radar sensors, acoustical sensors, periscopes and/or electro-optical sensors such as cameras, IR-cameras, for registering the environment (object/threat/terrain) surrounding the combat vehicle. The information provided by this set of sensors provides a complement to the tactical information provided from said digitized maps.

Combat vehicle commanders typically monitors information provided from the combat management system of the vehicle and information from the set of sensors and issue, based on this, verbal orders to the crew of the vehicle, the crews of other vehicles and/or command center.

This means that the vehicle commander is forced to shift focus between a series of different information sources whose information traditionally is displayed in dedicated display means such as display screens. Further, other members of the vehicle crew are not provided with overall situational awareness which means that they have to rely on the individual ability of the vehicle commander to simultaneously monitor a set of information provided through a plurality of display means and the ability of the vehicle commander to take quick and appropriate decisions based on this information.

Issuing of orders from the vehicle commander to members of the vehicle crew typically takes place through voice communication via inter-com, i.e. radio communication internally of the vehicle which means that only a limited amount of information can be provided to one or more crew members, i.e. information relating to orders cannot be shared faster than the vehicle commander orally can convey this information. This also means that the vehicle commander will have difficulty with monitoring the crews implementation of the task/order, i.e. follow-up on implementation of task via voice communication while the vehicle commander solves own tasks.

Apart from vehicle commander, gunner and driver other potential parts of the crew, cannot be assigned with tasks, unless positioned with hatch open or unless having access to a remote weapon station (RWS) with cameras.

In modern combat vehicles, the vehicle crew is offered limited or no support for cooperation for operating the vehicle in the best possible way.

These drawbacks means that the vehicle commander is exposed to a hard work load and that other members of the vehicle crew is provided with a very limited situational awareness.

Consequently, there is a need for presenting improvements within tactical systems for combat vehicles.

SUMMARY OF THE INVENTION

An object of the present invention is to provide a system and a method for processing of tactical information that enables improved situational awareness for crew members of a combat vehicle.

An additional object of the present invention is to provide a system and a method for processing of tactical information that enables reduced work load for a vehicle commander of a combat vehicle.

An additional object of the present invention is to provide a system and a method for processing of tactical information that enable crew members of a combat vehicle to faster perceive information regarding the surroundings of the vehicle and more quickly being able to react based on this information.

An additional object of the present invention is to provide a system and a method for processing of tactical information that enables an improved tactical route planning.

An additional object of the present invention is to provide a system and a method for processing of tactical information that enables improved cooperation with other vehicles of the own troop.

An additional object of the present invention is to provide a system and a method for processing and presentation of tactical information adapted for tactical advance of the combat vehicle and which enable the entire crew to contribute to operation of the combat vehicle in coordinated fashion.

These and other objects, apparent from the following description, are achieved by a system for processing of tactical information in a combat vehicle and a combat vehicle which are of the type stated by way of introduction and which in addition exhibits the features recited in the characterising clause of the appended claim 1. Preferred embodiments of the device and method are defined below.

According to the invention the objects are achieved by a system, integrated in a combat vehicle, for processing of tactical information in a combat vehicle, wherein the system comprising at least one image registering sensor arranged to register at least one image sequence displaying at least a portion of the surroundings of the combat vehicle. The system further comprising a navigation module arranged to register information at least indicating a current position of the combat vehicle and a tactical data module arranged to store tactical information, descriptive of the tactical environment in which the combat vehicle operate, whereby said tactical information at least comprises information describing a position of at least one tactical object and/or area. The system further comprising at least one information processing unit coupled to said at least one image registering sensor, said navigation module and said tactical data module to receive said at least one registered image sequence, said registered position of the combat vehicle and said stored tactical information. Said at least one information processing unit being arranged to superimpose the tactical information onto said at least one registered image sequence by means of processing said at least one registered image sequence based on the current position of the combat vehicle and the position of the at least one tactical object and/or area and display at least a portion of said at least one processed image sequence in at least one display unit coupled to said information processing unit.

Hereby, is enabled to provide improved situational awareness to operators of a combat vehicle such as a ground combat vehicle. This is achieved by means of processing information in the form of at least one image sequence, e.g. sensor video, to enable insertion, i.e. superimposition of tactical information onto the sensor video, which enable operators of the vehicle to obtain improved situational awareness simply by focusing on the content of the sensor video with superimposed tactical information indicating in the sensor video actual position of tactical objects/areas instead of as traditionally operate/monitor a plurality of instruments providing different aspects of situational awareness. This applies particularly for vehicle commanders that normally need to distribute focus between tactical information from a battle management system of the vehicle with a dedicated operator interface and information from different sensors of the vehicle provided via a plurality of different operator interfaces dedicated for each of the different sensors. It is further enabled to provide improved situational awareness of other members of the vehicle crew by means of that also these members can be provided with situational awareness in the form of a sensor video with superimposed tactical information instead of as traditionally only be provided with very limited situational awareness in the form of, voice communication, i.e. orally communicated information, from the vehicle commander and information from the or those sensors that each respective crew member is responsible for in terms of operation/monitoring. Furthermore, cooperation between all crew members of the vehicle is improved since all crew members may be provided with one and the same single perception of the current situation relating to the surroundings of the vehicle.

According to an embodiment said at least one information processing unit is arranged to process said at least one registered image sequence based on information describing the current position of the combat vehicle, at least one angle in which the at least one image registering sensor is arranged in relation to the combat vehicle at the moment of image registration and the position of said at least one tactical object and/or area in order to determine whether and where the tactical information should be superimposed in each respective image of said at least one registered image sequence.

According to an embodiment said at least one information processing unit is arranged to determine whether and where said tactical information should be superimposed based on the position of the combat vehicle, the position of said at least one tactical object and/or area, the angle of the image registering sensor in relation to the vehicle and a field of vision of the at least one image registering sensor.

According to an embodiment said tactical information is arranged to be superimposed onto said at least one registered image sequence in the form of at least one indicator displaying, in each respective image of said at least one registered image sequence, a line-of-sight to said at least one tactical object and/or area.

According to an embodiment said at least one information processing unit is arranged to process said at least one registered image sequence based on terrain information from a terrain database module of the system, wherein said terrain database module is arranged to store terrain information describing topology of terrain surrounding the vehicle.

According to an embodiment said at least one information processing unit is arranged to superimpose the tactical information onto said at least one registered image sequence in the form of at least one indicator displaying, in each respective image of said at least one registered image sequence, a line-of-sight to said at least one tactical object and/or area together with an indicator displaying if said at least one tactical object and/or area is visible or obscured by terrain along the line-of-sight in each respective image of said at least one registered image sequence.

By means of providing the above mentioned indicator displaying visibility of one or more tactical objects and/or areas it is enabled to highlight and realistically present, in the sensor video, tactical objects and/or areas that are fully or partly hidden by intermediate terrain.

According to an embodiment said at least one information processing unit is arranged to provide said at least one indicator displaying if said at least one tactical object and/or area is visible or obscured by terrain along the line-of-sight based on information relating to the position of said at least one tactical object and/or area, the position of the combat vehicle, terrain information, said at least one angle of the at least one image registering sensor relative to the vehicle at the moment of image registration.

According to an embodiment said at least one information processing unit is arranged to correlate said terrain information with said at least one registered image sequence to project said at least one registered image sequence onto said terrain information so as to enable three dimensional presentation of the superimposed tactical information in said at least one display unit.

By means of providing three dimensional presentation of sensor video, i.e. sensor video projected onto a topology map it is enabled to provide improved situational awareness since operators of the vehicle more simply can perceive surrounding terrain and where for example objects/areas, from the sensor video and/or from superimposed tactical information, are located in the terrain.

According to an embodiment said at least one tactical data module further comprises a tactical data link arranged to receive updated tactical information describing the tactical environment in which the vehicle operate to enable said tactical data module to update said stored tactical information with respect to presence and/or positional changes of tactical objects and/or areas.

By means of providing updated tactical information to the system received via the data link it is enabled to provide situational awareness that reflects changes in real time or at least close to real time.

According to an embodiment the system further comprises a tactical object database comprising stored graphical synthetic objects describing different types of tactical objects and/or areas.

By means of providing an object database it is enabled to visualize tactical objects and/or areas with increased realism which facilitates for operators of the vehicle to rapidly and easily obtain information from the sensor video with superimposed tactical information in the form of synthetic objects. As an example a tactical object in the form of a tank can be visualized as a tank instead of only be visualized as a positional indication with descriptive text.

According to an embodiment the system is further configured so that at least a portion of said stored tactical information comprises information indicating a type of tactical object and/or area.

According to an embodiment the system is configured so that at least a portion of said tactical information is arranged to be superimposed onto said at least one image sequence in the form of synthetic objects selected, by said at least one information processing unit, from the tactical object database based on said tactical information indicating the type of tactical objects and/or areas.

According to an embodiment said tactical information comprises information, at least, descriptive of position and/or type of at least one tactical object, wherein said at least one object is comprised of at least one object of enemy and/or own troop in the form of at least one object of a set of objects, at least, comprising a helicopter, an aircraft, an infantry soldier, an infantry soldier unit, a tank, a command center, an armoured personnel carrier, a troop transport vehicle, a building occupied by a troop, a bunker, a ground based surveillance vehicle, a jeep, an anti-aircraft unit, an artillery unit.

According to an embodiment said tactical information comprises information, at least, descriptive of position and/or type of at least one area, wherein said at least one tactical area is comprised of at least one area of a set of areas, at least, comprising a mine field, an observation area, a firing area, a firing position area, an area with particular terrain characteristics, a protection area, a re-grouping area, an advancement area, a fall-back area, a sunlit area, a shadow area, a building area, a civilian area, a smoke curtain area, an aerial support area, an artillery support area.

According to an embodiment said information processing unit is further arranged to process said at least one image sequence to superimpose tactical information onto said at least one image sequence relating to at least one digital order issued by a vehicle commander of the combat vehicle and/or at least one digital order issued by a remote command center.

By means of providing the opportunity to issue digital orders, i.e. orders visualized by means of superimposition onto the sensor video, issuing of local and central orders as well as the ability of the crew members to perceive orders are facilitated.

According to an embodiment said at least one digital order is arranged to be superimposed in the form of information describing instructions associated to said at least one digital order together with tactical information indicating one or more tactical objects and/or areas which said at least one digital order concerns.

By means of providing the opportunity for issuance of digital orders presented as information superimposed onto the sensor video the crew members of the vehicle can focus their attention to what is displayed in the sensor video instead of listening of order issuance provided via voice communication from a vehicle commander. Furthermore, several orders can be provided to several different crew members simultaneously which is not a possibility when using voice communication. Furthermore, the vehicle commander can focus on follow-up/execution of order visualized in the sensor video instead of focusing of the actual order issuance since less time is needed for issuance of digital orders.

According to an embodiment the system further comprises a tactical route planning module arranged to plan at least one route for the combat vehicle based on the current position of the vehicle and tactical information from said tactical data module and communicate information describing said at least one planned route to said at least one information processing unit so as to enable said at least one information processing unit to superimpose information relating to said at least one planned route.

By means of providing a route planning module that communicates information describing planned tactical routes to the information processing unit routes/proposed routes can be visualized in the form of information superimposed onto the sensor video the entire crew of the vehicle can easily obtain situational awareness information that displays planned route and the surrounding along the planned route.

According to an embodiment said tactical route planning module is arranged to automatically generate at least one digital order associated to said at least one planned route, or portions thereof, and communicate information describing said at least one planned route and said at least one digital order to said at least one information processing unit so as to enable said at least one information processing unit to superimpose information relating to said at least one planned route and said at least one automatically generated digital order onto said at least one registered image sequence.

By means of providing a route planning module with functionality for automatic/semi-automatic issuing of digital orders associated to routes the work load for the vehicle commander is reduced since some of the orders that suitably should be issued when travelling along a planned route are already generated automatically by the system.

According to an embodiment the system further comprises a threat detection unit at least coupled to said at least one image registering sensor, whereby said threat detection module is arranged to receive said at least one registered image sequence and detect threats in the surroundings of the vehicle based on information from said at least one registered image sequence so as to enable registration and superimposition of tactical information registered locally by the combat vehicle.

By means of providing a threat detection unit it is enabled to present information superimposed onto the sensor video that is perceived locally by the combat vehicle instead of being dependent of stored information of the tactical data module or information received via the tactical data link. This means that situational awareness can be provided also when failure conditions associated to the tactical data module or the tactical data link are present. Furthermore, the locally registered information can be used in conjunction with tactical information from the tactical data module so as to increase the accuracy/update-frequency of information from the tactical data module. Furthermore, the locally registered information can provide information that is not available via the tactical data module or the data link associated to the tactical data module.

According to an embodiment said at least one information processing unit is arranged to selectively superimpose said tactical information onto said at least one registered image sequence, for display in said at least one display unit, based on input of user instructions, relating to selection of tactical information, via at least one user interface.

By means of providing a user interface it is enabled to manually control which information that is to be presented superimposed onto the sensor video.

According to an embodiment said at least one information processing unit is arranged to utilize information from a rule database for selectively super imposing said tactical information onto said at least one registered image sequence for presentation in said at least one display unit.

By means of providing a rule database it is enabled to automatically control which information is to be presented superimposed onto the sensor video.

According to an embodiment said at least one rule database comprises at least one rule relates at least one type of tactical information to at least one role of a set of roles of vehicle operators enabling said at least one information processing unit to superimpose different types of tactical information onto said at least one registered image sequence based on role of the vehicle operator, which enables role dependent presentation.

By means of providing role dependent presentation of superimposed tactical information it is enabled to provide selective presentation that controls amount and type of information provided to each respective operator for example in terms of what information is required for each respective operator to be able to accomplish their assigned tasks.

According to an embodiment said rule database comprises at least one rule relating at least one type of tactical information to at least one mission type of a set of mission types in order to enable said at least one information processing unit to superimpose different types of tactical information onto said at least one registered image sequence based on a current mission type which enables mission dependent presentation of superimposed tactical information.

By means of providing mission dependent presentation of superimposed tactical information it is enabled to provide selective presentation that displays tactical information relevant for the mission currently being executed by the vehicle.

According to an embodiment said at least one rule database comprises at least one rule relating at least one type of tactical information to at least on future instant of time so as to enable said at least one information processing unit to superimpose different types of tactical information onto said at least one registered image sequence based on current time compared to said future instant of time which enables time dependent presentation of superimposed tactical information.

By means of providing time dependent presentation of superimposed tactical information it is enabled to provide selective presentation of tactical information, where situational awareness for example can be focused on events that is currently taking place or that will take place in a near future.

According to an embodiment said at least one rule database comprises at least one rule relating at least one type of object and/or area of said tactical information to at least one predetermined relative distance interval between current position of the combat vehicle and said at least one type of object and/or area within which interval tactical information indicating said least one type of object and/or area is arranged to be superimposed onto said at least one registered image sequence.

By means of providing distance dependent presentation of superimposed tactical information it is enabled to provide selective presentation of tactical information wherein situational awareness is adapted to the distance between the combat vehicle and one or more tactical objects and/or areas. This enables that the amount of information superimposed onto the sensor video can be controlled for example with respect to what is to be regarded as relevant information of importance to perceive for operators of the vehicle given distances to different types of objects and/or areas. This means that operators of the vehicle can focus on a reduced amount of superimposed information.

According to an embodiment said rule database is a dynamic rule database comprising at least one dynamic rule that can be updated in real time or close to real time based on at least one event of a set of events comprising an order issuance from a vehicle commander, a change of information of said tactical information, own firing, enemy firing and a changed position of the combat vehicle relative to at least one tactical object and/or area.

By means of providing at least one dynamic rule automatic control of tactical information superimposed onto the sensor video is enabled for example automatic control following changes in situational awareness/threat resulting from for example one or more changed positions of one or more tactical objects.

According to an embodiment said at least one sensor is comprised of at least one sensor of a set of sensors comprising a video camera, a still camera and an IR-camera.

By means of providing a system comprising one or more sensors, such as a camera and an IR-camera it is enabled to operate to provide situational awareness independent of the current visibility conditions for example both during day and night.

Apart from the above described system and combat vehicle the present invention also provides a method and a computer program for processing of tactical information of a combat vehicle.

The method comprises at least the steps of registering at least one image sequence displaying at least a portion of the surroundings of the vehicle using at least one image registering sensor arranged in an angle relative to the vehicle and registering a current position of the combat vehicle. The method further comprise the step of storing tactical information describing the tactical environment in which the vehicle operate, whereby said tactical information at least comprises information describing a position of a tactical object and/or area. The method further comprise the step of receiving, in at least one information processing unit, said at least one registered image sequence, said registered current position of the combat vehicle and said stored tactical information and super imposing the tactical information onto said at least one registered image sequence based on processing, by means of said at least one information processing unit, said at least one registered image sequence based on the current position of the combat vehicle, the position of said at least one tactical object and/or area. The method further comprise the step of presenting at least a portion of said at least one processed image sequence in at least one display unit coupled to said information processing unit.

The computer program comprise a computer readable program code which when executed by a processing unit in a combat vehicle based system comprising at least one image registering sensor, a digital storage medium and a display unit, causes the system to perform the above described method.

Further advantageous aspects of the system, the combat vehicle, the method and the computer program according to the invention will be apparent from the hereinafter following detailed description and from the subsequent claims.

BRIEF DESCRIPTION OF THE DRAWINGS

A better understanding of the present invention will be had upon the reference to the following detailed description when read in conjunction with the accompanying drawings, wherein like reference characters refer to like parts throughout the several views, and in which.

DETAILED DESCRIPTION OF THE INVENTION

Figure 1:
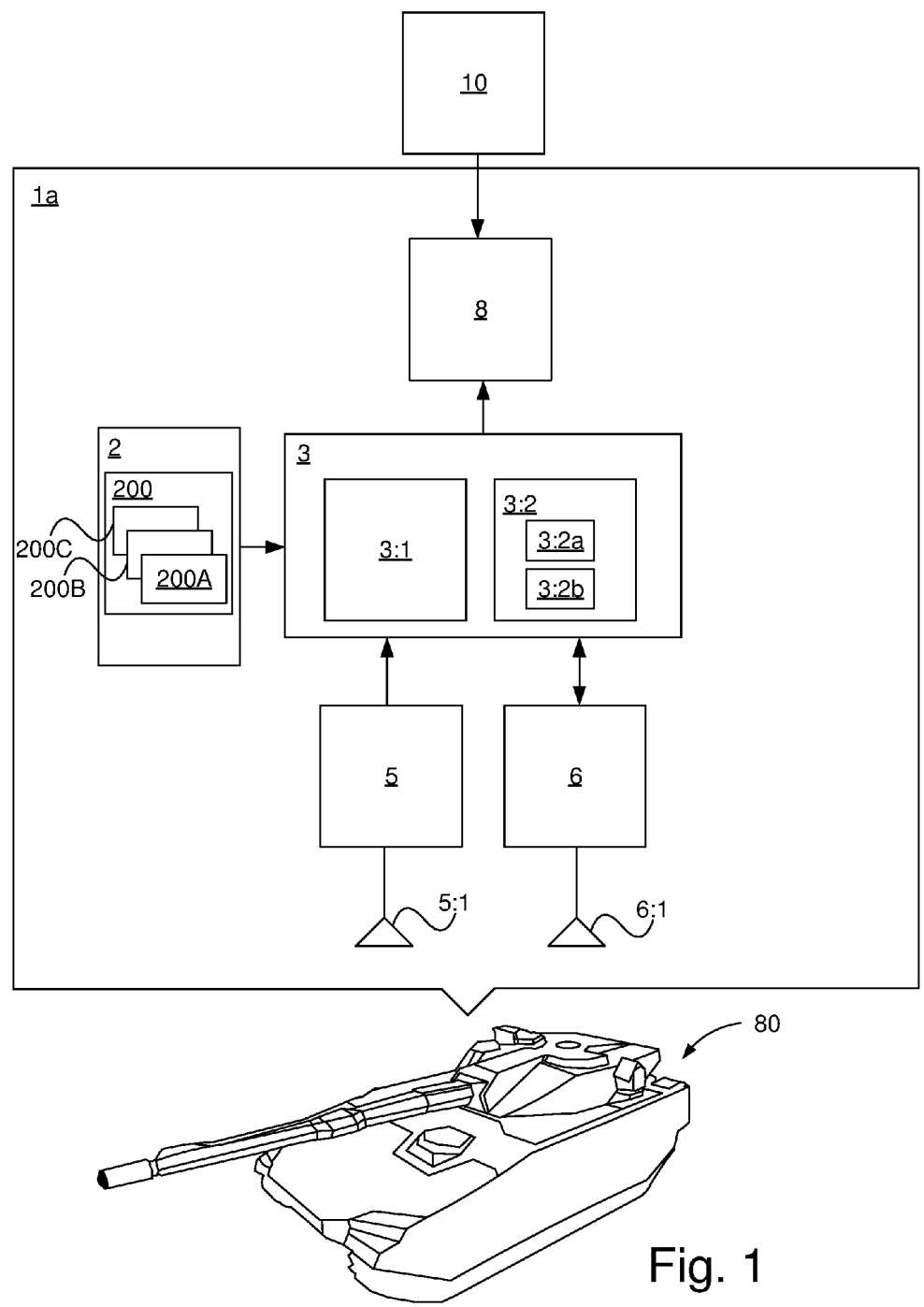
FIG. 1 schematically illustrates a block diagram of a system for processing of tactical information arranged to be integrated in a combat vehicle according to an embodiment of the present invention.

Herein the term "tactical information" is referred to as information describing the tactical environment in which the vehicle operate. In more detail the term "tactical information" relates to information that at least comprise information describing a position of at least one tactical object and/or area which is present and/or presumed present and/or presumed to be present in the surroundings of the combat vehicle. The tactical information may be information gathered historically and/or information gathered in real time or close to real time. The tactical information may be gathered by means of visual observation with and/or without aid, such as sensors etc., from for example a troop/vehicle. The tactical information may also be automatically gathered and processed by means of sensor systems provided with or coupled to data processing means. The tactical information may also be gathered by means of satellite/aerial surveillance or other suitable surveillance method. The tactical information may also be gathered by means of a geo-data gathering system alternatively provided by a geo-database. The tactical information may also relate to order from for example a command center or a vehicle commander, wherein said order relates to at least one tactical object and/or area, such as an order in the form of fire onto a first tactical object and/or area in the form of an enemy target such as a tank positioned at coordinates (X1,Y1,Z1) or advance to a first firing position area positioned at coordinates (X2,Y2,Z2), or advance along a first route with waypoint coordinates (W1,W2,W3). Apart from information relating to type of tactical object/area the tactical information may also comprise one or more instant of time for example describing when different parts of the tactical information is gathered and/or instants of time relating to order issuance, execution of orders etc. The tactical information may also relate to so called intelligence information.

Herein the term "tactical object" relates to an example of tactical information which relates to information describing a position and/or type of a tactical object, wherein said tactical object may be comprised of at least one unit of enemy and/or own troop in the form of an object of a group of objects at least comprising:

a helicopter, such as an attack helicopter or a transport helicopter;

an aircraft, such as a manned or un-manned combat-, transport- or surveillance aircraft;

an infantry soldier;

a troop unit, such as an infantry unit comprising a plurality of infantry soldiers;

a tank;

a command center, such as a mobile or stationary command center;

an armored personnel carrier;

a troop transport vehicle;

a building occupied by troop;

a bunker;

a ground based surveillance vehicle;

a jeep;

an anti-aircraft unit;

an artillery unit:

With position of a tactical object is meant one or more geographic coordinates representing the location and/or extent of the object. With type of object is meant information describing the characteristics of the object, i.e. for example tank, helicopter etc., of own of enemy troop according to the examples above. It should be appreciated that this list of object is only intended to exemplify what may constitute a tactical object, i.e. more types of objects than the above mentioned may constitute a tactical object.

Herein the term "tactical area" relates to an example of tactical information which relates to information describing position and/or type of a tactical area which may be comprised of at least one area of a group of areas at least comprising:

a mine field, i.e. a geographical area where mines exist or presumably exist;

an observation area, i.e. a geographical area which should be observed;

a firing area, i.e. a geographical area towards which firing takes place, should take place, or will take place;

a firing position area, i.e. a geographical area from which firing takes place, should take place or will take place;

an area with particular ground characteristics, i.e. a geographical area having particular ground characteristics, such as asphalt, swamp, lake, river etc. which all should be observed during operation of the vehicle;

a protection area, i.e. a geographical area that provides protection against detection and/or enemy fire;

a re-grouping area, i.e. a geographical area determined for re-grouping of member of own platoon/troop;

an advancement area, i.e. a geographical area along which advance takes place, should take place, or will take place;

a fall-back area, i.e. a geographical area a geographical area along which fall-back takes place, should take place, or will take place;

a sunlit area, i.e. a geographical area that is illuminated by sun which facilitates detection of own respectively enemy units;

a shadow area, i.e. a geographical area that is shaded which makes detection of own respectively enemy units more difficult;

a building area, i.e. a geographical area comprising buildings such as at least one building;

a civilian area, i.e. a geographical area with presumed or confirmed civilian activity;

an enemy area, i.e. a geographical area with presumed or confirmed enemy activity;

a smoke curtain area, i.e. a geographical area which is provided with, will be, or should be provided with a smoke curtain;

an aerial support area, i.e. a geographical area towards which aerial support is directed, should be directed or will be directed;

an artillery support area, i.e. a geographical area within which supporting artillery fire takes place, should take place, or will take place.

With position of a tactical area is meant one or more geographical coordinates representing the location/extent of the area. With type of area is meant information describing the characteristics of the area i.e. for example civilian area, firing position area etc. according to the examples above. It should be appreciated that this list of areas only is intended to exemplify what may constitute a tactical area, i.e. more types of areas that the above mentioned may constitute a tactical area.

FIG. 1 schematically illustrates a system 1*a* for processing of tactical information of a combat vehicle 80.

The system is arranged to be integrated in a combat vehicle 80, such as an armoured combat vehicle. Herein the combat vehicle is described as a tank, an armoured personnel carrier or a combat vehicle, but it should be pointed out that the invention also is possible to realize and implement in a water craft, such as for example in a surface combat ship. The system may also further be applied to a civilian vehicle or craft with the difference that the tactical information for these types of applications instead is comprised of a different type of environmental information with the purpose of facilitating operation for example in connection with navigation through traffic stocking and/or collision situations.

According to an embodiment the vehicle is a ship, such as a combat ship. According to an alternative embodiment the combat vehicle is an aerial vehicle such as for example a helicopter or an aircraft.

The system comprises at least one sensor 2 in the form of at least one image registering sensor arranged to register at least one image sequence 200 displaying at least a portion of the surroundings of the vehicle during operation.

Said at least one sensor 2 comprises at least one electro-optical sensor for registration of image information in the form of still images and/or image sequences such as video sequences. Said at least one image registering sensor is suitably a digital video camera configured to register images with the visual and/or infrared (IR) area. Said at least one image registering sensor may also be comprised of at least one analogue sensor. Said at least one image registering sensor may also be comprised of at least one image intensifier arranged to register images within the near infrared area.

According to a variant said system comprises a plurality of image registering sensors for registration of at least one image sequence displaying the surroundings of the vehicle, such as for example a combination of at least one video camera and at least one IR-camera.

Said at least one sensor may also be a moveable sensor such as a rotating image registering sensor which registers image sequences displaying the surroundings of the vehicle in a plurality of directions relative to the vehicle.

According to a variant said system comprises a plurality of image registering sensors that each registers image sequences displaying the surroundings of the vehicle in a plurality of directions relative to the vehicle. When the system comprises at least one moveable image registering sensor, said at least one moveable image registering sensor is arranged to register said at least one image sequence jointly with registering the angle relative to the vehicle at the moment of image registration.

Preferably, said at least one sensor is arranged to register said at least one image sequence jointly with register an instant of time indicating the moment of registration of said at least one image sequence, such as for example one instant of time for each respective image 200A-200C of said at least one image sequence 200.

Said at least one sensor 2 is suitably mounted externally of the vehicle 80. The system may also be arranged to utilize sensors already existing in the vehicle.

The system 1*a* further comprise a tactical data module 6, arranged to store tactical information. Said tactical information is mainly comprised of information relating to position and/or type of at least one tactical object and/or area. It can be mentioned as an example of information relating to a tactical object information describing a confirmed of presumed geographical position of an enemy tank. More example of tactical information have earlier been mentioned above and thus need not be repeated here.

Said tactical data module 6 is arranged to store said tactical information.

Said tactical data module may also be arranged with at least one data processor and at least one digital storage medium (not shown) for pre-processing of tactical information, for example for storage of tactical information with subsequent pre-processing of stored information such as prediction of routes of enemy units by means of Kalman-filtering based in historical position of enemy units.

Preferably, said tactical data module further comprise a tactical data link 6:1 for receiving of tactical information for example via remote update of tactical information provided from a command center. The update of tactical information may for example relate to update of positions/types of tactical objects/areas and/or presence of earlier not known tactical objects/areas. According to variant the tactical data module is comprised of at least parts of an already existing battle management system (BMS) of the vehicle.

The system 1*a* further comprises at least one information processing unit 3 comprising a data processing unit 3:1 and at least one data storage medium 3:2 for storage of digital information.

Said data processing unit may for example be comprised of a data central processing unit (CPU) or other suitable data processing unit.

According to a variant said information processing unit may be comprised of a field programmable gate array (FPGA) configured to perform the tasks arranged to be performed by the information processing unit according to what is described below.

Said at least one data storage medium 3:2 may be comprised of at least one memory in the form of a random access memory (RAM), a buffer memory such as a cache memory or a combination thereof.

The storage memory stores at least temporarily the sensor information that have been registered by said at least one sensor 2, that is the image information in the form of at least one image sequence that have been registered by said at least one image registering sensor 2, in a first memory module 3:2*a* of the storage medium 3:2 for storage of tactical information.

The storage medium 3:2 also comprises a second memory module 3:2*b* in which it stores a computer program which, when executed by said data processing unit 3:1 in the system 1, displays the registered stored sensor information with superimposed tactical information via a display unit 8 comprised in the system 1a in a fashion described more in detail below.

Advantageously, display units already existing in the combat vehicle is used for this purpose. This enable at least one operator 10 of the system, such as at least one crew member of the vehicle to see said sensor information with superimposed tactical information which improves situational awareness for said at least one operator.

According to a variant said information processing unit comprises a graphic processing unit (GPU, not shown) arranged to, based on processed information from the information processing unit, provide information to said at least one display unit causing presentation of said provided information. Alternatively said at least one information processing unit is coupled to said graphic processing unit for providing information to said graphic processing unit relating to data describing the processed image sequence to enable said graphic processing unit to provide instructions to said at least one display unit 8 via a connection to cause said at least one display unit to present said processed image sequence. Said graphic processing unit may also comprise at least one storage medium for storage of graphic processing instructions and/or at least temporary storage of processed information.

The system 1a further comprises a navigation module 5, which suitably comprises a GPS-receiver with associated GPS-antenna 5:1 for receiving of at least one GPS-signal. Said navigation module is arranged to register the geographical position of the combat vehicle. The geographical position of the vehicle, such as the current three dimensional geographical position, is sampled continuously during operation of the vehicle and position and time is stored in the module 3:2a for tactical information of the storage medium 3:2, to enable later use by the information processing unit for being able to reproduce the sensor information that have been registered by said at least one image registering sensor 2 with tactical information superimposed onto this sensor information.

In more detail said information processing unit 3 is arranged to receive said at least one image sequence from said at least one sensor 2, said current position of the vehicle from the navigation module 5 and said tactical information in the form of information describing position and/or type of at least one tactical object and/or area from the tactical data module. Said information processing unit is further arranged to process this information, i.e. position of the vehicle, The image sequence and position of said tactical information, to enable superimposition of said tactical information onto said at least one image sequence. This may be achieved by the information processing unit by means of that this unit calculates a bearing to said at least one tactical object and/or area based on the position of the vehicle 80 and the position of said at least one tactical object and/or area. Said calculated bearing to said at least one tactical object and/or area may be comprised of at least one first angular value indicating the angle between the combat vehicle and said at least one tactical object and/or area I azimuth direction and at least one second angular value indicating the angle between the combat vehicle and at least one tactical object and/or area in latitude direction. Said bearing indicating a line-of-sight to said at least one tactical object and/or area. This enable the information processing unit to superimpose information onto said at least one image sequence indicating the line-of-sight to said at least one tactical object and/or area. Said superimposed information indicating the line-of-sight to said at least one tactical object and/or area may suitably be comprised of symbolic, for example symbolic in the form of a line extending along the line-of-sight and/or a line/arrow pointing orthogonally towards said line-of-sight.

Preferably, said information processing unit 3 is arranged to use information describing the field of view (FOV) of said at least one sensor and information describing the angle of said at least one sensor relative to the vehicle at the moment of registration of said at least one image sequence when performing calculations for determining if and where said at least one tactical object and/or area should be superimposed onto said at least one image sequence. That is to determine if the bearing i.e. the line-of-sight to the target falls within the field of view of the sensor at the moment of image registration whereby said at least one tactical object and/or area should be visible in said at least one image sequence. This enables the information processing unit to determine if and also where tactical objects and/or areas should be superimposed based on their respective position i.e. if they are seen and if so where they have been seen from the field of view of the sensor as displayed by the images of said at least one image sequence.

According to a variant said information processing unit is arranged to operate in real time or close to real time so as to, in said at least one display unit 8, enable presentation of said at least one image sequence with superimposed tactical information in real time or close to real time.

Figure 2:
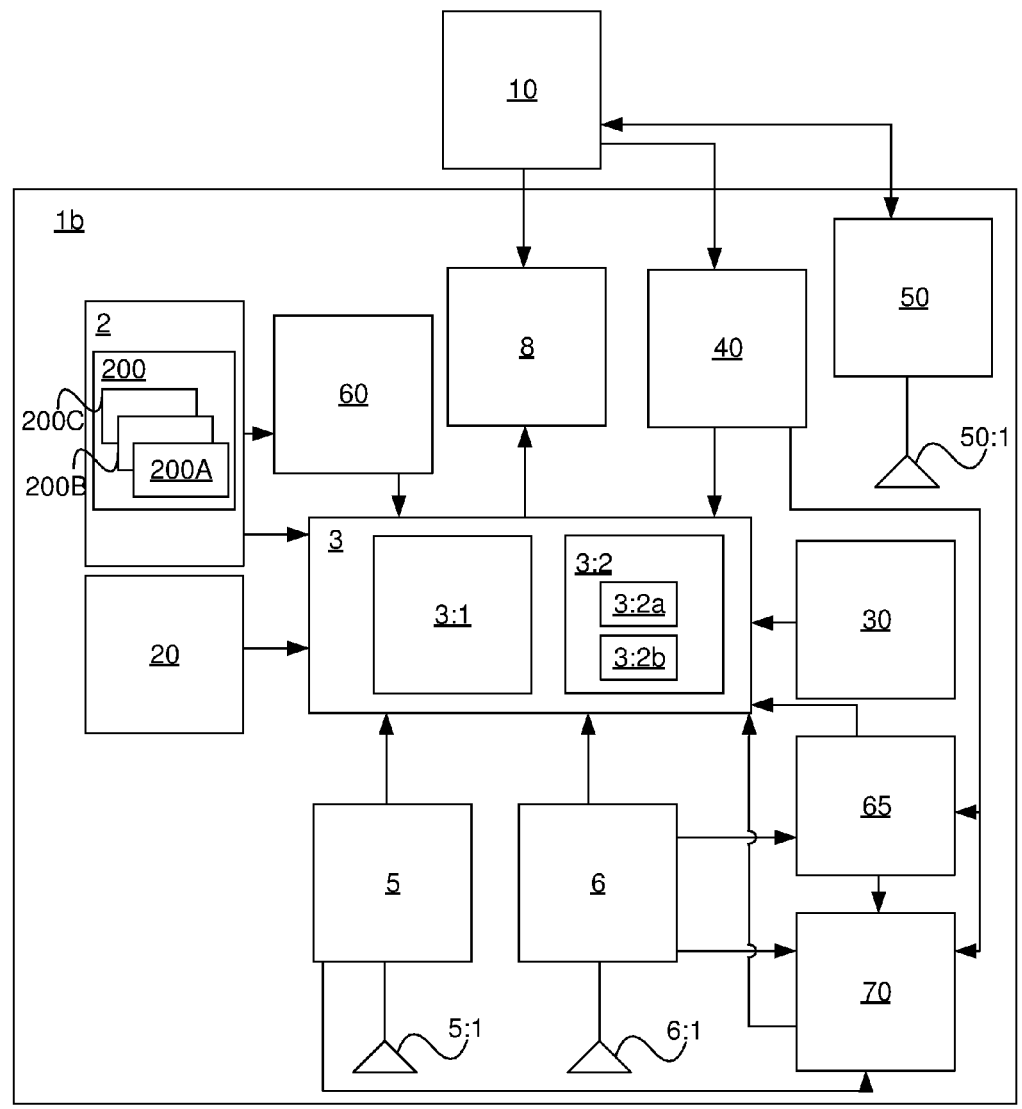
FIG. 2 schematically illustrates a block diagram of a system for processing of tactical information arranged to be integrated in a combat vehicle according to an embodiment of the present invention.

FIG. 2 schematically illustrates a system 1b for processing of tactical information of combat vehicle 80.

The system 1b in similar to the system 1a, exemplified in FIG. 1, comprises at least one image registering sensor 2, at least one information processing unit 3, a navigation module 5, a tactical data module and at least one display unit 8, the system 1b differs from the system 1a by means of comprising one or more additional components/sub-systems.

The system 1b comprises a terrain database module 20 comprising terrain information, wherein said terrain database module is arranged to store terrain information describing the topology of terrain surrounding the vehicle. Terrain information may for example be comprised of a three dimensional map. Said terrain database module is arranged coupled to said information processing unit 3 for enabling communication of terrain information to said information processing unit 3.

According to a variant said information processing unit 3 is arranged to use the information from the terrain database by means of projecting said at least one image sequence with superimposed tactical information onto a topology map, i.e. three dimensional, provided by the terrain database module which creates a three dimensional presentation that may be presented in said at least one display unit 8. In order to generate this projection the information processing unit is arranged to apply a correlation procedure where the topology map is correlated with the field of view of said at least one sensor at the moment of registration of said at least one image sequence 200. That is the information processing unit calculates which part of the topology map that corresponds to the field of view of said at least one sensor at the moment of image registration. This may be achieved by means of using information describing the current position of the vehicle, the field of view of the sensor and the angle of the sensor relative to the vehicle.

According to a variant said information processing unit 3 is arranged to use the information from the terrain database in order to provide an indication in the form of superimposed tactical information indicating whether tactical objects and/or areas are visible, partly visible or obscured by terrain.

This may for example be visualized in the form of information superimposed onto said at least one image sequence wherein the superimposed information for example by means of using different colours to indicate whether tactical objects and/or areas are visible, partly visible or obscured by terrain. As an example a coloured arrow pointing in a direction along a line-of-sight or orthogonally to a line-of-sight towards a tactical object and/or area may be used, wherein the colour indicates the visibility conditions, i.e. if it is obscured or not. In order to calculate whether said tactical object and/or area is visible said information processing unit may be arranged to calculate a directional vector or a bearing from the vehicle to said tactical object and/or area based on the position of the vehicle and the positions of said tactical object and/or area. Subsequently the information processing unit may calculate whether any object obscures the visibility from said vehicle to said tactical object and/or area based on said calculated bearing, indicating the line-of-sight to said tactical object and/or area, and information describing the topology in the surroundings of the vehicle.

The system 1b comprises an object database 30 comprising a set to stored graphical synthetic objects representing different types of tactical objects and/or areas. Said graphical synthetic objects may be two and/or three dimensional. Said graphical synthetic objects may also be configured with different colours or line dashes to indicate different types of tactical information. An example of a three dimensional graphic synthetic object may be a tank of a certain type. The colour of the graphical synthetic object may be varied to indicate if it belongs to own or enemy troop. Since that the tactical information indicates information relating to a type of tactical object and/or area the information processing unit is enabled to determine which synthetic object to select, to retrieve from the object database and subsequently use to illustrate the tactical object and/or area in the form of tactical information superimposed onto said at least one image sequence.

According to a variant said information processing unit is further arranged to use information relating to position of the vehicle and position of the tactical object and/or area to be represented by said synthetic object in order calculate a scale factor. By means of applying said scale factor on said synthetic object a correct distance projection is achieved in superimposition of the synthetic object onto said at least one image sequence which creates a higher degree of realism in the presentation.

According to a variant, in case the system apart from comprising an object data also comprises a terrain database then also terrain data may be used when performing the above described processing to allow the information processing unit to superimpose said synthetic object onto said at least one image sequence with correct distance projection, i.e. by means of using terrain information to determine how the synthetic objects will be superimposed in said at least one image sequence with regard to obscuring terrain. This enables for example that synthetic objects may be presented superimposed onto said at least one image sequence so that at least parts of synthetic objects may be obscured by terrain such as trees, houses, hills etc. Alternatively terrain of said at least one image sequence may be reproduced fully or at least partly transparently. This may for example be realised by means of that the parts of the image sequence that based on the terrain information is determined to obscure parts of the synthetic object is reproduced with a particular transparency factor, i.e. for these parts the information from the image sequence is superimposed onto the synthetic object that is obscured by terrain.

The system 1b also comprises a user interface 40 arranged to allow at least one operator 10 of the system to interact with the system. The user interface is arranged to communicate user instruction to said at least one information processing unit 3. User instruction may be communicated via suitable input means coupled thereto and/or to the display unit 8. Said input means may be comprised of a computer mouse, a keyboard, a touch screen, joystick, bezel buttons of the display unit, or similar. The operator may by means of using the input means and the user interface interact with the system to control the configuration of the presentation displaying the at least one image sequence with superimposed tactical information. According to a variant said above mentioned presentation comprises a menu system which is operated by means of said input means and said user interface. The menu system may for example provide at least one user dialog for selection of which tactical information to be displayed superimposed. This user dialog may for example be a menu window with a plurality of check boxes for selection of which type of tactical information to be presented superimposed. This enables selective reproduction of tactical information superimposed onto said at least one image sequence based on filtration of which tactical information that is to be superimposed based on the selection of the operator, as indicated in said user dialog.

According to a variant said at least one information processing unit is arranged to, onto said at least one at least one image sequence, to superimpose tactical information in the form of at least one digital order. Said at least one digital order is arranged to be superimposed in the form of information describing instructions associated to said at least one digital order jointly with tactical information indicating which one or more tactical objects and/or areas which the at least one digital order concerns. As an example of how a digital order may be superimposed, a text string indicating what the order concerns, for example "provide an area with a smoke screen" together with a time indicator, such as second dial that counts down, indicating when the order is expected to be executed, may superimposed onto the at least one image sequence together with an indicator pointing to a tactical area which will be provided with the smoke screen. These digital orders may either be generated by the vehicle commander via an order issuance menu system (not shown) that is operable via said user interface or be generated based on information from a command center, for example in the form of information received via said tactical data module describing a tactical area together with what is expected to be executed within the tactical area at which instant of time. These digital orders may also according to a variant be generated automatically based on information received from for example a mission planning module and/or a route planning module which are described in more detail below. In case the system comprises a plurality of display units, such as one display unit for each vehicle operator, the digital orders may also be generated and presented locally for the respective operator concerned with the order, for example a vehicle commander may order a vehicle gunner to combat a particular target.

The system 1b suitably also comprises a threat detection module 60 arranged to provide locally gathered tactical information based on information from said at least one image registering sensor. Said threat detection module being coupled to said at least one sensor 2 in order to receive said at least one image sequence. The threat detection module also suitably comprises image processing means (not shown) arranged to analyse the content of said at least one image sequence in order to detect the presence of threats in the surroundings of the vehicle. The image processing means may for example use a camera transform together with information relating to the position and movement of the vehicle based on historical positional data in order apply an optical flow calculation method on said at least one image sequence in order to determine the position of moveable objects in the at least one image sequence. Said optical flow calculation method comprising calculations for identification of the focus of expansion (FOE) of each respective image of said at least one image sequence. The image processing may also use other types of image processing methods in order to identify objects of interest in the images, such as image processing methods that identifies firing based on the characteristics of muzzle flashes. The information relating to position of threats may thus be used as complementing tactical information which may be communicated from said threat detection module to said information processing unit to enable this to superimpose also this tactical information onto said at least one image sequence for display in said at least one display unit. The information processing unit may also be arranged to fuse tactical information from said threat detection module, i.e. local tactical information with tactical information from said tactical data module in order to reduce the risk of confusing one threat with several different threats and in order to improve the accuracy with regard to for example position of threats i.e. tactical objects and/or areas.

The system 1b also suitably comprises a communication module 50 arranged to enable at least one operator of the system such as at least one member of the vehicle crew to communicate via voice internal of the vehicle ("inter-com") and/or external of the vehicle such as with other units of own troop or a command center. Said communication module preferably also comprises an antenna device such as a radio antenna 50:1 to enable said communication.

The system 1b also suitably comprises a mission management module 65 arranged to handle mission information. Said mission management module is configured to be coupled to said tactical data module to enable receiving tactical information from said tactical data module for example in the form of information relating to tactical objects and/or areas. The mission management module may as an example be arranged to provide target prioritization i.e. prioritization of which target of a plurality of targets to be attacked first. This prioritization process may for example be performed by said mission module based on tactical information in the form of type and positions of tactical objects, such as position and type of enemy units. For example the type of enemy unit may constitute a factor in connection to said target prioritization process, where the type tank is assigned top priority, the type armoured personnel carrier is assigned medium high priority, the type attack helicopter/transport helicopter is assigned medium priority and where the type enemy troop/infantry is assigned low priority. In connection to this prioritization said mission module may also be arranged to use information relating to position of the vehicle 80 provided from said navigation module and terrain information from said terrain database. This means that distance and intermediate terrain between the vehicle and the targets may be regarded during the target prioritization process. Said mission management module is further configured for coupling to said user interface to enable for said at least one operator of the system to interact with the mission management module. Said mission management module is further coupled to said information processing unit 3 to enable said information processing unit to receive information describing mission related information. This enables the information processing unit to superimpose information relating to said mission related information onto said at least one image sequence for display in said at least one display unit 8. As an example number indicating target prioritization could be displayed next to indicators, displaying line-of-sights to different targets such as enemy units, superimposed onto said at least one image sequence. This information i.e. the result of the target prioritization process may according to a variant comprise a digital order which is automatically forwarded to an operator for example a vehicle gunner.

The system 1b suitably also comprises a route planning module 70 arranged to manage planning of routes of the vehicle. Said route planning module is arranged to receive information relating to position of the vehicle from said navigation module 5, possible mission information from said mission management module for example in the form of target objects, tactical information from said tactical data module an in case the system comprises a terrain database also terrain information from the terrain database. Based on the above mentioned received information the route planning module may calculate at least one suitable route for the vehicle. This may for example be achieved by means of dividing a geographical area surrounding the vehicle into a number of sectors. The route planning module may subsequently calculate an overall cost factor for each sector based on the tactical information and terrain information for example by means of that proximity to enemy position renders a higher cost and that impassable terrain renders a higher cost whilst undemanding terrain that offers protection against detection and/or enemy fire renders a lower cost. The route planning module may then calculate the a suitable route based on the cost for each respective sector by means of for example hierarchical analysis such a tree search, Dijkstra's method or other suitable method that progresses from the current position of the vehicle and sums the cost for sectors in direction towards the final destination of the route with the purpose of providing a quick and effective way of finding a route with low overall cost that also provides a short distance to the final destination.

Said route planning module is further coupled to said user interface 40 to enable said at least one operator to interact with said route planning module for example in connection to selection of a plurality of routes proposed by the route planning module or for indication of target coordinates for the route. Said route planning module is further couple to said information processing unit 3 so as to enable said information processing unit to receive information describing planned routes or selected planned routes. A route planned by the route planning module may be described by a plurality of waypoint coordinates (waypoints) each expressed in three dimensions. This enables the information processing module to superimpose information relating so said planned route, for example in form of an advance area, onto said at least one image sequence for presentation in said at least one display unit 8. This information i.e. the result of the route planning process may according to a variant constitute a digital order which is automatically forwarded to for example a driver of the vehicle. According to a variant said route planning module is further arranges to automatically generate information describing additional tactical objects and/or areas which may be provided to said at least one information processing unit for superimposition onto said at least one image sequence. As an example the route planning module could apart from automatically generating suitable tactical advancement area also be arranged to automatically generate suitable observation areas and protection areas, which are position dependent i.e. dependent of the position of the vehicle along the planned route, for example presumed enemy positions or suitable protection areas along the planned route. These additional tactical objects and/or areas may according to a variant be generated as role dependent digital orders. i.e. digital orders intended for one or more operators of the vehicle, such as a driver of the vehicle and/or a vehicle gunner. In order to generate role dependent digital orders a rule database may for example be used which is described in more detail below. Suitably the system 1b comprises a plurality of display units intended for different operators of the vehicle to enable role dependent presentation of digital order i.e. digital orders are only presented in the display unit or the display units intended for the or those operators concerned with the order. Said digital order generated by the route planning module may further comprise information additional information besides tactical objects and/or areas. As an example said additional information could be comprised of textual instructions associated to said at least one digital order together with information indicating which tactical information, i.e. indicating which one or more tactical object and/or areas said at least one digital order concerns. An example of a digital order comprising addition order related information may be a textual instruction describing the order for example "take position in protection area" and information describing a tactical object and/or areas which the order concern for example a particular protection areas with a particular position as indicated by said tactical information. Furthermore, this exemplified order could be made role dependent by means of only being issued to for example a driver of the vehicle. Information relating to digital orders is arranged to be provided together with said at least one planned route to said at least one information processing unit to enable said at least one information processing unit to superimpose information associated to said at least one route together with information associated to digital orders. This allows said at least one information processing unit to process said at least one image sequence based on the position of the combat vehicle in order to superimpose information describing said at least one planned route together with digital order intended to be executed, at for example one or more positions, along the planned route. Suitably information describing the angle relative to the combat vehicle in which the image registering sensor is arranged at the moment of registration is also used by said at least one information processing unit for this purpose i.e. associating information of said at least one image sequence to said at least one planned route and digital orders in order to enable correct positioning/scaling/projection of information superimposed onto said at least one image sequence.

According to an embodiment said at least one information processing unit comprises a rule database. Said rule database is suitably stored in the module 3:2a for tactical information of the storage medium 3:2. Said rule database comprises configuration information describing a set of rules in the form of a set of conditions for if, when, at what positions and for whom, i.e. for which operator of the vehicle of a plurality of vehicle operators, superimposed tactical information should be presented. Said rule database is further arranged to provide information to said at least one information processing unit to enable said at least one information processing unit to, in said at least one display unit, cause selective presentation of superimposed tactical information based on at least one rule of said set of rules of said rule database.

According to a variant said rule database comprises at least one rule relating at least one type of tactical information to at least one role of a set of roles of vehicle operators in order to enable said at least one information processing unit to superimpose different type of tactical information onto said at least one image sequence based on the role of the vehicle operator which enables role dependent presentation. A rule may for example associate a particular vehicle operator, i.e. operator role, such as a vehicle driver role to at least one type of a tactical object and/or area such as for example the tactical area types mine field and advance area and tactical objects in the form of enemy troop. As a further example a rule could associate a vehicle gunner role to the tactical area types firing area, observation area and to tactical objects in the form of enemy troop. The system according to this variant suitably comprises a plurality of display units arranged for the respective operator role which enables each respective operator of the vehicle to be provided with a tailored presentation comprising tactical information that is adapted for each respective role. Additional roles for which rules may be created are for example a vehicle commander roles to which suitable types of tactical objects and/or areas may be associated.

According to a variant said rule database comprises at least one rule relating at least one type of tactical information to at least one mission type of a set of mission types in order to enable said at least one information processing unit to superimpose different types of tactical information onto said at least one image sequence based on the current mission type which enables mission dependent presentation of superimposed tactical information. Said set of mission types may for example be comprised of a surveillance mission, a monitoring mission, a patrol mission, a support mission, a transport mission for transport of supplies and/or own troop, a command mission or a peace keeping mission. This means that the presentation of tactical information, that is superimposed onto said at least one image sequence, may be adapted based on the mission to comprise a suitable set of tactical objects and/or areas. Information describing the mission currently being executed may either be pre-stored in the module 3:2a or be inputted manually for example via the user interface 40 in order to enable said at least one information processing unit to selectively present tactical information based on the mission currently being executed.

According to a variant said at least one rule database comprises at least one rule relating at least one type of tactical information to at least one mission specific parameter of a set of mission specific parameters, such as mission specific parameters associated to mission objective and/or mission sub-objectives, in order to enable said at least one information processing unit to superimpose different types of tactical information onto said at least one image sequence based on mission objectives which enables mission dependent presentation of superimposed tactical information. This mission specific information may for example be provided from said mission planning module 65. This enables the information processing unit to cause presentation of tactical information for example based on which sub-objective of the mission that is currently being executed. As an example a particular set of types of tactical information may be arranged to be superimposed when the vehicle is in motion and moves from a re-grouping area towards a firing position area and a different set of types of tactical information may be arranged to be superimposed when the vehicle is positioned in place inside the firing position area. Information describing the type sub-objectives that is currently being executed may be inputted manually for example via the user interface 40 in order to enable the at least one information processing unit to selectively present tactical information based on the sub-objective currently being executed.

According to a variant said rule database comprises at least one rule relating at least one type of tactical information to at least one future instant of time in order to enable said at least one information processing unit to superimpose different types of tactical information onto said at least one image sequence based on current time compared to said future instant of time which enables time dependent presentation of superimposed tactical information. This time dependent presentation of superimposed information may either relate to de-activation/activation of superimposed presentation of one or more tactical objects and/or areas or change of attribute of one or more already activated tactical objects and/or areas i.e. changing colour/shape/text of actively presented tactical objects and/or areas. Said future instant of time may for example relate a an instant of time in the future when artillery fire will commence against a particular tactical object and/or area and for how long commenced artillery fire against a particular tactical object and/or area will proceed. That is the future instant of time is comprised of one or more instants of time indicating when in time tactical events associated to one or more tactical objects and/or areas are planned. As an example a tactical area in the form of an artillery support area could be presented, as a black ring indicating the geographical area for which firing is currently planned, superimposed onto said at least one image sequence 60 second before artillery firing is planned to be commenced. According to this example said ring indicating the geographical area could further shift colour from black to red at the instant of time when firing is planned to be commenced and finally shift colour from red to green, alternative be de-activated when firing has stopped or when firing is planned to end. The future instants of time, triggering said above mentioned at least one time based rule, may generated in a plurality of ways, for example automatically by the route planning module, automatically by the mission planning module, manually by means of user input via the user interface, or automatically based on information received from and stored by the tactical data module or a combination thereof. Said at least one future instant of time may also be arranged to trigger renewed digital order issuance, superimposition of already generated digital orders onto said at least one image sequence, change of already superimposed tactical information or a combination thereof. Renewed digital order issuance may either take place automatically via said route planning module, said mission planning module or manually by means of user input via said user interface. That is when the future instant of time occurs this may automatically trigger a signal to the mission planning module, the route planning module or trigger superimposition of a textual prompt for example to the vehicle commander to issue new digital order via the user interface. As an example triggering of digital order in connection to said at least one future instant of time, relating to when supporting artillery fire or directed aerial support towards a particular tactical area has stopped could trigger a signal causing the issuance of a digital order relating to advance along an advance area or route towards the tactical area towards which supporting fire took place earlier and where said digital order is superimposed onto said at least one image sequence. According to this example the information describing said future instant of time relating to end of supporting fire could be obtained in the form of a predetermined/planned instant of time stored and/or received at the tactical data module, or in the form of user input via the user interface following visual observation of the tactical area, such as visual observation performed by a crew member of the vehicle 80, or in the form of that the threat detection module automatically generates information describing said future instant of time based on performing image processing on images registered in direction towards the area towards which supporting fire has taken place. As another example of triggering of digital orders, associated to said at least one future instant of time, a future instant of time associated to when another vehicle of own troop has advanced to a predetermined position or a predetermined tactical area and/or when this other vehicle has commenced firing towards a particular tactical area, could trigger a signal causing issuance of a digital order of the own vehicle that is superimposed onto said at least one image sequence, wherein said digital order relates to advancement along an advance area or route. This enables the own vehicle to advance along the advance area knowing that one flank is covered by the other vehicle. According to this example information describing said future instant of time relating to when the other vehicle has reached the predetermined position and/or commenced firing is received by the system 1b of the own vehicle through visual observation and subsequent user input via the user interface, or by means of communication from the other vehicle to the own vehicle for example via the communication module 50, or by means of reception of information via the tactical data module.

According to a variant the system 1b further comprises logics for separating planned and non-planned firing. This logics may use the information from the threat detection module, weapon system of the own vehicle 80, the tactical data module or a combination thereof to determine whether firing from the own vehicle or other vehicles of own troop is planned or non-planned. This provides the ability to separate planned suppressive firing, from non-planned firing which may indicate enemy contact, i.e. if a vehicle of own troop opens fire according to plan from a planned position/area towards a planned position/area this should not be indicate that the vehicle has enemy contact and has opened fire against the enemy. This also means that information associated to future instants of time can be obtained with greater accuracy, i.e. for example that planned firing that has commenced corresponds to planned and not to non-planned firing. Furthermore information indicating non-planned firing, i.e. enemy contact may be used by the system to trigger digital orders, superimposition of information onto said at least one image sequence or change of information already superimposed onto said at least one image sequence. This information may also be used in connection to a dynamic rule in terms of being descriptive of an event as described in more detail below.

According to a variant said rule database comprises at least one rule relating at least one type of tactical object and/or area of said tactical information to at least one predetermined relative distance interval between the current position of the combat vehicle and said at least one type of object and/or area. Where tactical information indicating said at least one type of object and/or area is arranged to be superimposed onto said at least one image sequence when the combat vehicle is located within said distance interval. This enables said at least one information processing unit to selectively superimpose information based on the current distance from the combat vehicle to one or more types of tactical objects and/or areas. As an example a rule could define that when the combat vehicle is located within an interval from 0-100 m from a mine field area, then that tactical area type mine field area will be superimposed onto said at least one image sequence.

According to a variant said rule database is a static rule database, i.e. a rule database with stored predetermined rules that cannot be updated during ongoing operation of the vehicle. According to a variant the rule database is configured by the vehicle commander for example at an instant of time before and/or during the mission. According to a variant said rule database is a dynamic rule database, i.e. a rule database with predetermined rules, whereof at least one rule may be updated during ongoing operation of the vehicle. According to this variant i.e. rule database with one or more dynamic rules at least one or said one or more rules may be updated following for example a changed situation awareness i.e. based on tactical information describing a changed situational awareness (updated positions of own/enemy troop, own firing towards a particular direction/position, alternately advance with suppressive own firing etc.) and/or following order issuance from a vehicle commander. In more detail said dynamic rule database may comprise at least one dynamic rule that automatically may be updated in real time or at least close to real time based on at least one event of a set of events at least comprising order issuance from a vehicle commander, change of information of said tactical information, own firing, enemy firing and a changed position of the combat vehicle relative to at least one tactical object and/or area. The information that cause change of an existing rule may for example be comprised of information in the form of one or more events that have been registered by said at least one information processing unit, such as for example an order issuance, a change in own position or a change of an enemy position. Where information regarding events may be received by said at least one information processing unit from for example the navigation module 5, the tactical data module 6, the threat detection module 65 or the route planning module 70.

It should also be noted that a dynamic rule may comprise at least one conditioned rule instruction for example an "if-statement" that provides for that the rule may be executed differently based on different events that have been registered for example based on events such as change in position of the combat vehicle or change in position of an enemy unit.

According to a variant said at least one information processing unit 3 is arranged to provide at least one panoramic view displaying at least a portion of the surroundings around the combat vehicle based on processing of said at least one image sequence 200 from said at least one image registering sensor 2. In more detail said at least one information processing unit according to this variant is arranged to merge images 200A-200C of said at least one image sequence through so called image stitching based on identification of overlapping pixels i.e. pixels of several different images of the images 200A-200C that has been identified as representative for the same part of the surroundings of the vehicle. By means of identifying overlapping pixels it is enabled to merger said images to a panoramic view in a correct fashion with regard to positioning of said images relative to each other. This suitably takes place before the information processing unit commences initialization of processes associated to superimposition of information onto said at least one image sequence. This enables the system to present a panoramic view with superimposed tactical information.

According to a variant the system 1b is arranged to map the surroundings of the vehicle. According to this variant the system is configured to use information relating to distance to different parts of the surroundings of the vehicle provided from at least one radar unit (not shown) of the system or at least one radar unit already existing in the vehicle. Alternatively the system is arranged to use distance information from at least two mutually displaced image registering sensors or at least one moveable image registering sensor. According to this variant the information processing unit by means of using information from, said radar unit alternatively said above mentioned sensors providing distance information in combination with information describing the position of the vehicle, is further arranged to generate and store a three dimensional map describing the surroundings of the vehicle. In case the system 1b comprises a terrain database module 20 with stored terrain information describing the topology of terrain surrounding the vehicle, for example in the form of a three dimensional map, the information from the generated three dimensional map may be used to complement the information from the terrain database module. This may for example be achieved by means of that the information processing unit may be arranged to detect differences between terrain information stored at the terrain database module and terrain information generated by the information processing unit based on information describing distances to the surroundings of the vehicle. These detected differences may subsequently be used by the information processing unit to fuse the information from the terrain database module with terrain information generated by the information processing unit. This is particularly advantageous since terrain and objects of the terrain during a combat situation undergo severe changes for example caused by firing which means that predetermined terrain information such as the terrain information stored at the terrain database module no longer is representative for the surroundings of the vehicle. This is further advantageous since reliable terrain information not always is available beforehand for all geographic areas, which often is the case for conflict areas.

According to a variant said information processing unit is arranged to process at least one image sequence from the at least one video camera and at least one image sequence from at least one IR-camera in order to provide a sensor video with superimposed tactical information i.e. an image sequence based on images provided said at least one video camera with superimposed tactical information for example from said tactical data module 6 and an IR-sensor video with superimposed tactical information, i.e. a sensor video based on images from said at least one IR-camera with superimposed tactical information for example from said tactical data module 6. According to this variant the IR-sensor video and the sensor video may be arranged to be presented in different windows of said display unit 8. Alternatively an operator of the vehicle may shift between display of the IR-sensor video by means of using user input means, such as said user input means 40. Alternatively at least a subset of the IR-sensor video may be arranged to be superimposed onto the sensor video. For example hot-spots i.e. areas of the sensor video exhibiting high temperature, may be arranged to be superimposed onto the sensor video. This may be achieved by means of the information processing unit being configured to detect areas of said at least one image sequence from said at least one IR-camera exhibiting a temperature in excess of at least one predetermined threshold temperature. Said at least one threshold temperature may for example be associated to a heat signature and/or temperature that is characteristic of a human being or a vehicle or portions thereof. After having detected presence of hot-spots of the IR-sensor video the information processing unit may be configured to process the information from the IR-sensor video and the sensor video so that detected hot-spots are indicated superimposed onto the sensor video.

It should be noted that the system 1b may be configured differently than the system 1b exemplified with reference to FIG. 2. For example the system 1b may comprise more or fewer sub-systems/modules/components. As an example the system 1b may solely comprise a terrain database module in addition to a base configuration of the system 1b corresponding to the parts that is comprised in the system 1a exemplified with reference to FIG. 1. It should further be noted that functionality of particular sub-systems/modules/components of the system 1b such as functionality relating to the object database, threat detector, route planning module, mission module etc. instead of being performed by dedicated units partly or fully may be performed by the information processing unit. Furthermore, some functionality of the information processing unit may partly or fully be performed by other dedicated units of the system.

Figure 3:
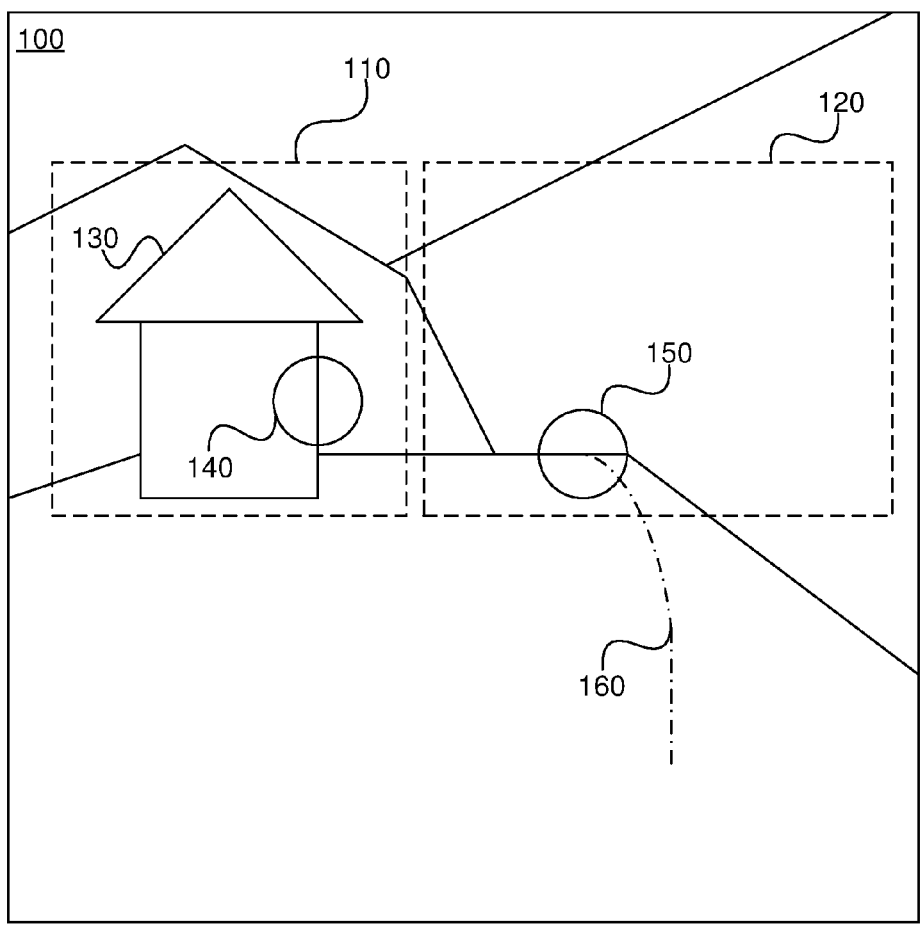
FIG. 3 schematically illustrates a presentation of tactical information superimposed onto at least one image sequence according to an embodiment of the present invention information.

FIG. 3 shows a view 100 displaying an image sequence, or portions thereof, such as an image, with superimposed tactical information.

The view 100 arranged for presentation of said at least one display unit 8 arranged in the vehicle 80 comprises at least one image of said at least one image sequence with superimposed tactical information.

The view 100, exemplified with reference to FIG. 3, comprises scenery, i.e. landscape such as building, mountains etc. (landscape is illustrated with solid lines in FIG. 3 and a building is illustrated by an object with reference 130), of the surroundings of the vehicle as registered by said at least one image registering sensor 2. The view further comprise two tactical areas in the form of a first and a second observation area 110, 120, i.e. areas of interest for at least one member of the vehicle crew to observe. The view further comprise two tactical areas/positions 140, 150 corresponding to areas/positions that two weapon system of the vehicle currently is aimed at.

The exemplified view 100 further comprise an advance route 160 such as advance route, i.e. a route along which the combat vehicle suitably should be driven, planned/generated by said route planning module.

It should be noted that the view exemplified with reference to FIG. 3 only is intended as an example and that other view also may be provided which may differ from the exemplified view with reference to FIG. 3, wherein these other views may comprise more or fewer superimposed objects such as tactical objects and/or areas with different position and/or type. Furthermore, appearance/attribute, such as appearance/attribute of symbolic representing these tactical objects and/or areas may be configured differently, than exemplified in FIG. 3, in terms of for example colour and shape. Furthermore, as has been mentioned earlier also terrain data may be visualized by means of projecting said at least one image sequence onto for example a topology map in order to provide a three dimensional presentation. Furthermore, also synthetic objects may be appended in order to graphically visualize for example enemy units located within the field of vision of the sensor.

Figure 4:
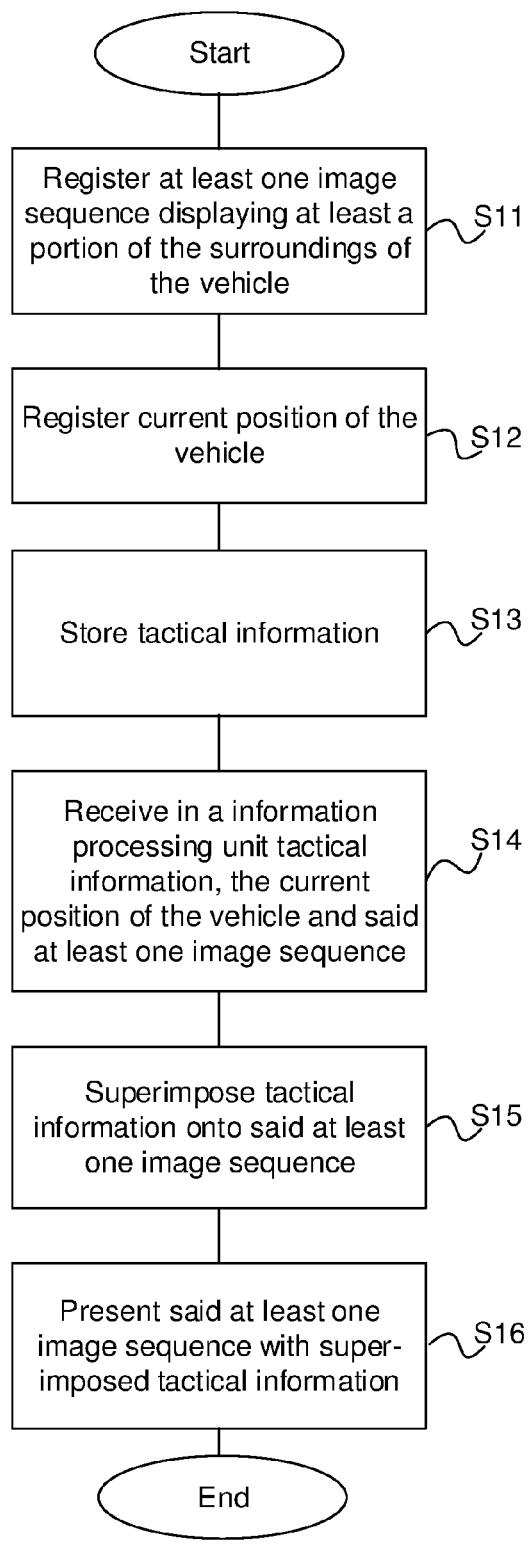
FIG. 4 schematically illustrates a flow diagram of a method for processing of tactical information of a combat vehicle according to an embodiment of the present invention.

FIG. 4 shows a method for processing of tactical information of a combat vehicle, according to an embodiment of the present invention.

The method comprises a first method step S11. The method step S11 comprises to register at least one image sequence displaying at least a portion of the surroundings of vehicle. In more detail the image sequence 200 is registered by means of at least one image registering sensor 2. After the method step S11 a subsequent method step S12 is performed.

The method step S12 comprises to register a current position of the vehicle. In more detail a geographic position such as a three dimensional geographic position is registered. Preferably the position of the vehicle is registered by means of a GPS-receiver 5. After the method step S12 a subsequent method step S13 is performed.

The method step S13 comprises to store tactical information. In more detail information describing at least position of at least one tactical object and/or area, for example the determined and/or presumed position of an enemy unit and/or coordinates indicating an area where mines are laid, i.e. a mine field, is stored. After the method step S13 a subsequent method step S14 is performed.

The method step S14 comprises to receive the tactical information, the current position of the vehicle and said at least one image sequence. In more detail said above mentioned information is received by an information processing unit 3. After the method step S14 a subsequent method step S15 is performed.

The method step S15 comprises to superimpose the tactical information onto said at least one image sequence. In more detail said at least one information processing unit 3 superimposes the tactical information onto said at least one image sequence by means of processing positional information regarding the tactical information and the position of the vehicle. The purpose of the processing that is performed by the information processing unit is to determine whether tactical objects/areas should be visible or not in the registered image sequence based on calculations regarding positions of tactical objects/areas relative to the field of view of the sensor at the moment of registration. Information that is superimposed onto the image sequence may be comprised of at least one indicator that indicates the position of tactical objects/areas along a line-of-sight in images of said at least one image sequence. Additional information may also be superimposed such as for example distance from the vehicle to tactical object/area and/or type of tactical object/area. Preferably also information indicating the angle of the sensor relative to the vehicle at the moment of registration of the image sequence and information describing the field of view (FOV) of the sensor is also used in said processing. After the method step S15 a subsequent method step S16 is performed.

According to a variant the step S15 may also comprise to process information mentioned in connection to step S15 together with information from a terrain database describing the topology of the surroundings of the vehicle. According to a variant this information from the terrain database is used to project said at least one image sequence with superimposed tactical information onto the topology of the surroundings of the vehicle in order to create a three dimensional presentation of said at least one image sequence with superimposed tactical information. According to variant the information processing unit may further use the information from the terrain database to determine whether entire or portions of tactical objects/areas are visible along a line-of-sight of one or more images of said at least one image sequence and based thereon indicate by the superimposed information whether the tactical object/area is visible or not. This indication may for example be comprised of an arrow with a particular colour, wherein the arrow indicates the line-of-sight to the tactical object/area and wherein the colour of the arrow indicated if it is visible or obscured by terrain.

According to a variant the step S15 may also comprise to process information mentioned in connection to the step S15 together with the tactical information describing also type of tactical object/area apart from position of at least one tactical object/area and information from an object database relating to graphical representation of different types of objects/areas i.e. synthetic objects. This enables the information processing unit to superimpose the tactical information in the form of synthetic objects representing actual tactical objects/areas onto said at least one image sequence by means of matching type of tactical object/area indicated by the tactical information to corresponding type of synthetic object of the object database. The information processing unit may further based on the relative distance between the vehicle and said at least one tactical object/area determine a correct projection for superimposition of said synthetic object onto said at least one image sequence. That is by having knowledge about the position of the vehicle and the tactical object/area the information processing unit may apply a scale factor to said synthetic object so that this synthetic object may be reproduced superimposed onto said at least one image sequence with correct size projection/distance projection. In case also terrain data is used in said above described processing the information processing unit may also superimpose said synthetic objects with correct projection onto said at least one image sequence, i.e. by means of using terrain information to determine how the synthetic objects should be superimposed onto said at least one image sequence with regard to obscuring terrain. This means that for example synthetic objects may be reproduced superimposed onto said at least one image sequence so that at least parts of synthetic objects may be obscured by terrain such as trees, houses, hills etc. Alternatively terrain of said at least one image sequence obscuring said synthetic objects may be reproduced partly or fully transparent. This may for example be achieved by means of that those parts of the image sequence that based on the terrain information is determined to obscure at least parts of the synthetic object are reproduced with a particular transparency factor i.e. for those parts the information from the image sequence is superimposed onto the parts of the synthetic object that is obscured by terrain.

The method step S16 comprises to present at least a portion of said at least one processed image sequence. In more detail said processed image sequence or portions thereof is presented in at least one display unit 8 coupled to said information processing unit 3. After the method step S16 the method may end or alternatively be repeated from method step S11 so as to superimpose tactical information onto at least one additional image sequence registered by said at least one sensor 2.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. A system, integrated in a combat vehicle, for processing of tactical information of the combat vehicle, the system comprising:
   at least one image registering sensor arranged to register at least one image sequence displaying at least a portion of surroundings of the vehicle, wherein said at least one sensor is comprised of at least one sensor of a set of sensors comprising a video camera, a still image camera and an IR-camera;
   a navigation module comprising a GPS-receiver and a digital storage medium and arranged to register information at least indicating a current position of the vehicle;
   a tactical data module comprising a digital storage medium and arranged to store tactical information describing a tactical environment in which the vehicle operate, wherein said tactical information comprises information at least describing a position of at least one tactical object and/or area;
   at least one information processing unit coupled to said at least one sensor, said navigation module and said tactical data module receiving said at least one registered image sequence, said registered current position of the combat vehicle and said stored tactical information, wherein said at least one information processing unit is arranged to superimpose the tactical information onto said at least one registered image sequence by processing said at least one registered image sequence based on the registered current position of the combat vehicle and the position of said at least one tactical object and/or area, and to present at least a portion of said at least one processed image sequence in at least one display coupled to said information processing unit, and
   wherein said at least one information processing unit further is arranged to process said at least one registered image sequence based on terrain information from a terrain database module of the system, wherein said terrain database module is arranged to store terrain information describing the topology of terrain surrounding the vehicle, and
   wherein said at least one information processing unit is arranged to superimpose the tactical information onto said at least one registered image sequence in the form of at least one indicator displaying, in each respective image of said at least one registered image sequence, a line-of-sight to said at least one tactical object and/or area together with an indicator displaying whether said at least one tactical object and/or area is visible or obscured by terrain along the line-of-sight in each respective image of said at least one registered image sequence, and
   wherein said at least one information processing unit is arranged to provide said at least one indicator displaying whether said at least one tactical object and/or area is visible or obscured by terrain along the line-of-sight based on information relating to the position of said at least one tactical object and/or area, the current position of the vehicle, the terrain information and said at least one angle of the image registering sensor relative to the combat vehicle at the moment of image registration.

2. The system of claim 1, wherein said at least one information processing unit is arranged to process said at least one registered image sequence based on information describing the current position of the combat vehicle, at least one angle in which said at least one image registering sensor is arranged relative to the combat vehicle at a moment of image registration and the position of said at least one tactical object and/or area in order to determine whether and where said the tactical information shall be superimposed in each respective image of said at least one registered image sequence.

3. The system of claim 2, wherein said at least one information processing unit is arranged to determine whether and where said tactical information shall be superimposed based on the current position of the combat vehicle, the position of said at least one tactical object and/or area, the angle of the image registering sensor relative to the combat vehicle and a field of view of said at least one image registering sensor.

4. The system of claim 1, wherein said tactical information is arranged to be superimposed onto said at least one registered image sequence in the form of at least one indicator displaying, in each respective image of said at least one registered image sequence, a line-of-sight to said at least one tactical object and/or area.

5. The system of claim 1, wherein said at least one information processing unit is arranged to correlate said terrain information with said at least one registered image sequence in order to project said at least one registered image sequence onto said terrain information so as to enable three dimensional presentation of superimposed tactical information in said at least one display.

6. The system of claim 1, wherein said tactical data module further comprises a tactical data link arranged to receive updated tactical information describing the tactical environment in which the vehicle operate so as to enable said tactical data module to update said stored tactical information with regard to presence and/or positional changes of tactical objects and/or areas.

7. The system of claim 1, further comprising a tactical object database comprising stored graphical synthetic objects describing different types of tactical objects and/or areas.

8. The system of claim 7, wherein at least a portion of the stored tactical information comprises information indicating a type of tactical object and/or area.

9. The system of claim 8, wherein said at least one portion of said tactical information is arranged to be superimposed onto said at least one registered image sequence in the form of synthetic objects selected, from the tactical object database, by said at least one information processing unit based on said tactical information indicating the type of tactical object and/or area.

10. The system of claim 1, wherein said tactical information comprises information describing position and/or type of at least one tactical object, wherein said at least one tactical object is comprised of at least one object of enemy and/or own troop in a form of at least one object of a group of objects at least comprising a helicopter, an aircraft, an infantry soldier, an infantry soldier unit, a tank, a command center, an armoured personnel carrier, a troop transport vehicle, a building occupied by a troop, a bunker, a ground based surveillance vehicle, a jeep, an anti-aircraft unit, an artillery unit.

11. The system of claim 1, wherein said tactical information comprises information describing position and/or type of at least one area, wherein said at least one tactical area is comprised of at least one area of a group of areas comprising at least a mine field, an observation area, a firing area, a firing position area, an area with particular ground characteristics, a protection area, a re-grouping area, and advance area, a fall-back area, a sunlit area, a shadow area, a building area, a civilian area, an enemy area, a smoke curtain area, an aerial support area, an artillery support area.

12. The system of claim 1, wherein said information processing unit further is arranged to process said at least one registered image sequence to superimpose tactical information, onto said at least one image sequence, relating to at least one digital order issued by a vehicle commander of the combat vehicle and/or at least one digital order issued by a remote command center.

13. The system of claim 12, wherein said at least one digital order is arranged to be superimposed in a form of information describing instructions associated to said at least one digital order together with tactical information indicating one or more tactical objects and/or one or more areas which said at least one digital order concerns.

14. The system of claim 1, further comprising a tactical route planning module comprising a processor and arranged to plan at least one route for the combat vehicle, based on the current position of the combat vehicle and tactical information from said tactical data module, and to communicate information describing said at least one planned route to said at least one information processing unit so as to enable said at least one information processing unit to superimpose information relating to said at least one planned route.

15. The system of claim 14, wherein said tactical route planning module is arranged to automatically generate at least one digital order associated to said at least one planned route, or portions thereof, and communicate information describing said at least one planned route and said at least one digital order to said at least one information processing unit in order to enable said at least one information processing unit to superimpose information relating to said at least one planned route and said at least one automatically generated digital order onto said at least one registered image sequence.

16. The system of claim 1, further comprising a threat detection unit comprising a processor and at least coupled to said at least one image registering sensor, wherein said threat detection unit is arranged to receive said at least one registered image sequence and to detect threats in the surroundings of the vehicle based on information from said at least one image sequence so as to enable registration and superimposition of tactical information registered locally at the combat vehicle.

17. The system of claim 1, wherein said at least one information processing unit is arranged to selectively superimpose tactical information onto said at least one registered image sequence for presentation in said at least one display based on input of user instructions, relating to a selection of tactical information, via at least one user interface.

18. The system of claim 1, wherein said at least one information processing unit is arranged to use information from a rule database in order to selectively superimpose said tactical information onto said at least one registered image sequence for presentation in said at least one display.

19. The system of claim 18, wherein said rule database comprises at least one rule relating at least one type of tactical information to at least one role of a set of vehicle operator roles in order to enable said at least one information processing unit to superimpose different types of tactical information onto said at least one registered image sequence based on the role of vehicle operator which enables role dependent presentation.

20. The system of claim 18, wherein said rule database comprises at least one rule relating at least one type of tactical information to at least one mission type of a set of mission types in order to enable said at least one information processing unit to superimpose different types of tactical information onto said at least one registered image sequence based on a current mission type which enables mission dependent presentation of superimposed tactical information.

21. The system of claim 18, wherein said rule database comprises at least one rule relating at least one type of tactical information to at least one future instant of time in order to enable said at least on information processing unit to superimpose different types of tactical information onto said at least one registered image sequence based on current time compared to said at least one future instant of time which enables time dependent presentation of superimposed tactical information.

22. The system of claim 18, wherein said rule database comprises at least one rule relating at least one type of object and/or area of said tactical information to at least one predetermined distance interval between the current position of the vehicle of the combat vehicle and said at least one type of object and/or area within which interval tactical information indicating said at least one type of object and/or area is arranged to be superimposed onto said at least one registered image sequence.

23. The system of claim 18, wherein said rule database is a dynamic rule database comprising at least one dynamic rule that may be updated in real time or close to real time based on at least one event of a set of events comprising an order issuance from a vehicle commander, a change of information of said tactical information, own firing, enemy firing and a changed position of the combat vehicle relative to at least one tactical object and/or area.

24. A method for processing of tactical information of combat vehicles comprising the steps of:
registering at least one image sequence displaying at least a portion of surroundings of the combat vehicle by at least one image registering sensor, wherein said at least one sensor is comprised of at least one sensor of a set of sensors comprising a video camera, a still image camera and an IR-camera;
registering a current position of the combat vehicle;
storing tactical information describing a tactical environment in which the combat vehicle operate, wherein said tactical information at least comprises information describing a position of at least one tactical object and/or area;
receiving, at an information processing unit, said registered current position of the vehicle and said stored tactical information;
superimposing the tactical information onto said at least one registered image sequence by processing, using said information processing unit, of said at least one registered image sequence based on the registered current position of the combat vehicle and the position of said at least one tactical object and/or area and to present at least a portion of said at least one processed image sequence in at least one display coupled to said information processing unit, wherein
the processing of said at least one registered image sequence comprises processing based on terrain information from a terrain database module, wherein said terrain database module is arranged to store terrain information describing the topology of terrain surrounding the vehicle;
the superimposing of the tactical information comprises superimposing in the form of at least one indicator displaying, in each respective image of said at least one registered image sequence, a line-of-sight to said at least one tactical object and/or area together with an indicator displaying whether said at least one tactical object and/or area is visible or obscured by terrain along the line-of-sight in each respective image of said at least one registered image sequence, wherein said at least one indicator displaying whether said at least one tactical object and/or area is visible or obscured by terrain along the line-of-sight is provided based on information relating to the position of said at least one tactical object and/or area, the current position of the vehicle, the terrain information and said at least one angle of the image registering sensor relative to the combat vehicle at the moment of image registration.

25. A computer program, stored on a non-transitory storing medium, for processing of tactical information, wherein the computer program, which when executed by a data processing unit in a combat vehicle based system comprising an image registering sensor for registering at least one image sequence displaying at least a portion of the surroundings of the vehicle, a navigation module comprising a GPS-receiver and a digital storage medium for registering a current position of the combat vehicle, a tactical data module comprising a digital storage medium for storage of tactical information, and a display, causes the system to perform the method of claim 24.

26. A combat vehicle comprising a system integrated in the combat vehicle for processing of tactical information of the combat vehicle, the system comprising:
at least one image registering sensor arranged to register at least one image sequence displaying at least a portion of surroundings of the vehicle, wherein said at least one sensor is comprised of at least one sensor of a set of sensors comprising a video camera, a still image camera and an IR-camera;
a navigation module comprising a GPS-receiver and a digital storage medium and arranged to register information at least indicating a current position of the vehicle;
a tactical data module comprising a digital storage medium and arranged to store tactical information describing a tactical environment in which the vehicle operate, wherein said tactical information comprises information at least describing a position of at least one tactical object and/or area;
at least one information processing unit coupled to said at least one sensor,
said navigation module and said tactical data module receiving said at least one registered image sequence, said registered current position of the combat vehicle and said stored tactical information, wherein said at least one information processing unit is arranged to superimpose the tactical information onto said at least one registered image sequence by processing said at least one registered image sequence based on the registered current position of the combat vehicle and the position of said at least one tactical object and/or area, and to present at least a portion of said at least one processed image sequence in at least one display coupled to said information processing unit.

* * * * *